United States Patent
Agombar et al.

(10) Patent No.: US 10,114,568 B2
(45) Date of Patent: Oct. 30, 2018

(54) PROFILE-BASED DATA-FLOW REGULATION TO BACKEND STORAGE VOLUMES

(71) Applicant: International Business Machines Corporation, Armonk, NY (US)

(72) Inventors: John P. Agombar, Winchester (GB); Ian Boden, Eastleigh (GB); Gordon D. Hutchison, Eastleigh (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 15/283,768

(22) Filed: Oct. 3, 2016

(65) Prior Publication Data
US 2018/0095682 A1 Apr. 5, 2018

(51) Int. Cl.
G06F 3/06 (2006.01)
G06F 12/128 (2016.01)
G06F 12/0811 (2016.01)

(52) U.S. Cl.
CPC ............ *G06F 3/0619* (2013.01); *G06F 3/067* (2013.01); *G06F 3/0665* (2013.01); *G06F 12/0811* (2013.01); *G06F 12/128* (2013.01); *G06F 2212/283* (2013.01); *G06F 2212/69* (2013.01)

(58) Field of Classification Search
CPC ...... G06F 3/0619; G06F 3/067; G06F 3/0665; G06F 12/128; G06F 12/0811; G06F 2212/69; G06F 2212/283
See application file for complete search history.

(56) References Cited

U.S. PATENT DOCUMENTS

| | | |
|---|---|---|
| 9,268,652 B1 | 2/2016 | Salyers et al. |
| 2009/0276654 A1* | 11/2009 | Butterworth .......... G06F 11/182 714/1 |
| 2016/0065675 A1 | 3/2016 | Brand |
| 2016/0112513 A1 | 4/2016 | CaraDonna et al. |
| 2016/0150047 A1 | 5/2016 | O'Hare et al. |

OTHER PUBLICATIONS

Yang, Suli, et al., "Tombolo: Performance Enhancements for Cloud Storage Gateways," 32nd International Conference on Massive Storage Systems, http://storageconference.us/2016/Papers/Tombolo.pdf, May 5, 2016.

* cited by examiner

*Primary Examiner* — Reginald Bragdon
*Assistant Examiner* — Mehdi Namazi
(74) *Attorney, Agent, or Firm* — Nelson and Nelson; Daniel P. Nelson; Alexis V. Nelson

(57) ABSTRACT

A method for regulating a flow of data to backend storage devices includes generating, at a host system, writes intended for a backend storage volume. The method receives the writes into a first level cache of a storage virtualization appliance. The method further determines whether destaging the writes directly from the first level cache to the backend storage volume would cause a limit associated with the backend storage volume to be exceeded. If destaging the writes directly from the first level cache to the backend storage volume would cause the limit to be exceeded, the method destages the writes from the first level cache to a second level cache of the storage virtualization appliance. Otherwise, the method destages the writes directly from the first level cache to the backend storage volume. A corresponding system and computer program product are also disclosed.

20 Claims, 7 Drawing Sheets

PROFILE-BASED DATA-FLOW REGULATION TO BACKEND STORAGE VOLUMES

BACKGROUND

Field of the Invention

This invention relates to systems and methods for regulating data flow to backend storage devices.

Background of the Invention

In some storage architectures, a storage virtualization appliance such as IBM's SAN Volume Controller (SVC) may be logically located between host systems and backend storage systems. The storage virtualization appliance may provide a virtualization layer between the host systems and storage systems. Specifically, the storage virtualization appliance may present itself to host systems as a storage provider (target) and present itself to storage systems as a single host system (initiator). Configuring the storage architecture in this manner may enable many components of the storage architecture to be replaced with minimal disruption. It may also provide compatibility between components in strongly heterogeneous server and storage environments.

A storage virtualization appliance such as SVC typically includes a cache that stores a relatively small amount of data (typically under 1 TB) to provide fast response times to hosts systems. The cache also enables the storage virtualization appliance to absorb bursts of write data without the host systems being aware of the write performance of storage systems behind the storage virtualization appliance.

The ability of a storage virtualization appliance to absorb writes from a host system is not unlimited, however. For example, consider a storage system that is able to absorb 1 GB of data per second and a storage virtualization appliance that has a 10 GB cache. If a host system writes data to the cache at a rate of 1.1 GB per second, the cache can only absorb data for one hundred seconds before it runs out of space (since the cache is filling at a rate of 1.1 GB-1.0 GB, or 0.1 GB per second). Thus, in this example, the storage virtualization appliance may only mask the fact that the host system is submitting more data than the storage system can handle for one hundred seconds. While this may be sufficient for bursts of writes that are less than one hundred seconds, it can be problematic for longer bursts of data, such as data backups or other large transfers of data. It may be particularly problematic with cloud-based storage systems that may incur additional costs when peak bandwidth or other limits are exceeded.

In view of the foregoing, what are needed are systems and methods to more effectively regulate rates at which data is transferred to storage systems. Ideally, such systems and methods will be able to ensure that limits associated with particular storage systems are not exceeded.

SUMMARY

The invention has been developed in response to the present state of the art and, in particular, in response to the problems and needs in the art that have not yet been fully solved by currently available systems and methods. Accordingly, the invention has been developed to regulate a flow of data to backend storage devices. The features and advantages of the invention will become more fully apparent from the following description and appended claims, or may be learned by practice of the invention as set forth hereinafter.

Consistent with the foregoing, a method for regulating a flow of data to backend storage devices is disclosed herein. In one embodiment, such a method includes generating, at a host system, writes intended for a backend storage volume. The method receives the writes into a first level cache of a storage virtualization appliance. The method further determines whether destaging the writes directly from the first level cache to the backend storage volume would cause a limit associated with the backend storage volume to be exceeded. If destaging the writes directly from the first level cache to the backend storage volume would cause the limit to be exceeded, the method destages the writes from the first level cache to a second level cache of the storage virtualization appliance. By contrast, if destaging the writes directly from the first level cache to the backend storage volume would not cause the limit to be exceeded, the method destages the writes directly from the first level cache to the backend storage volume. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
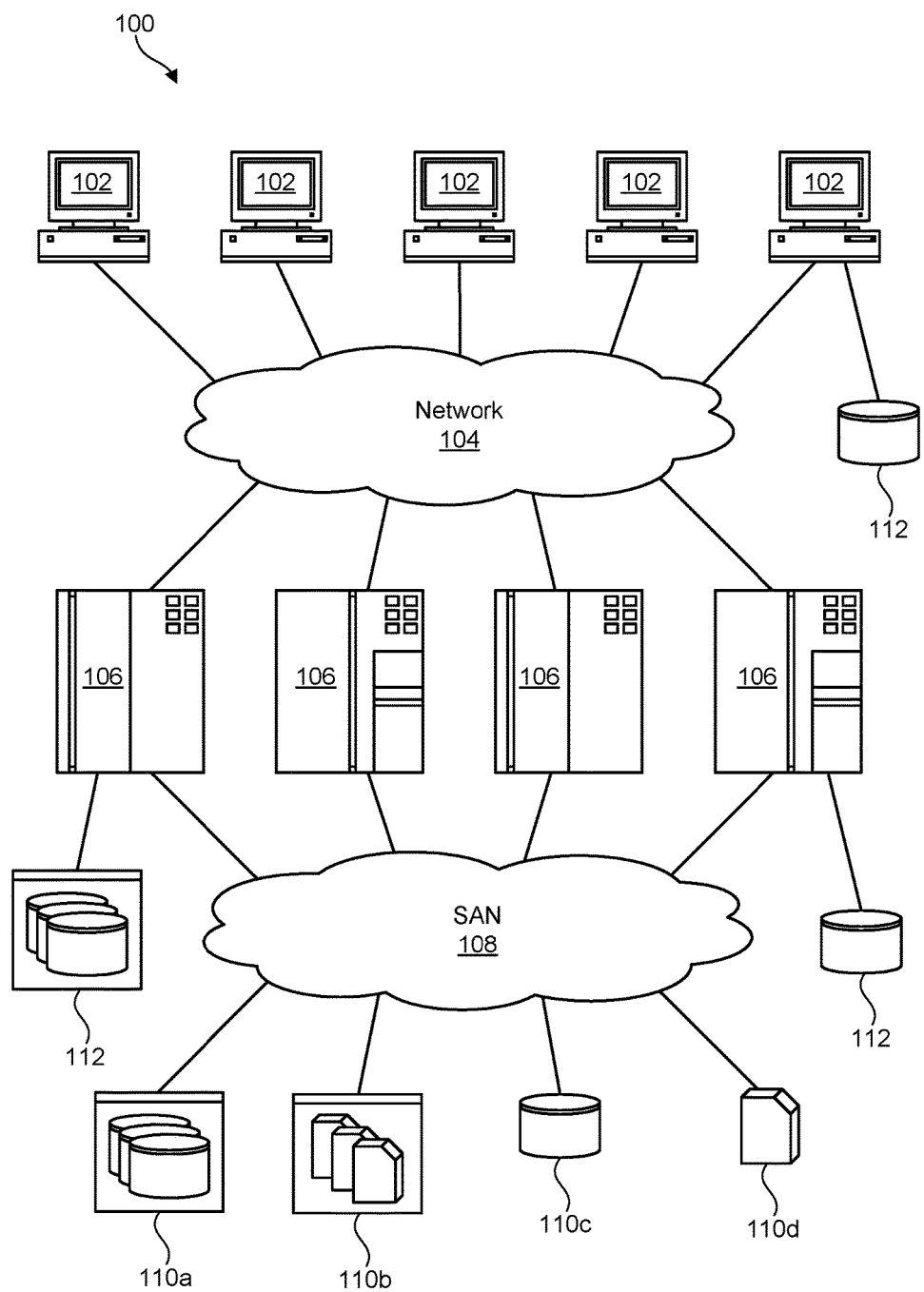
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
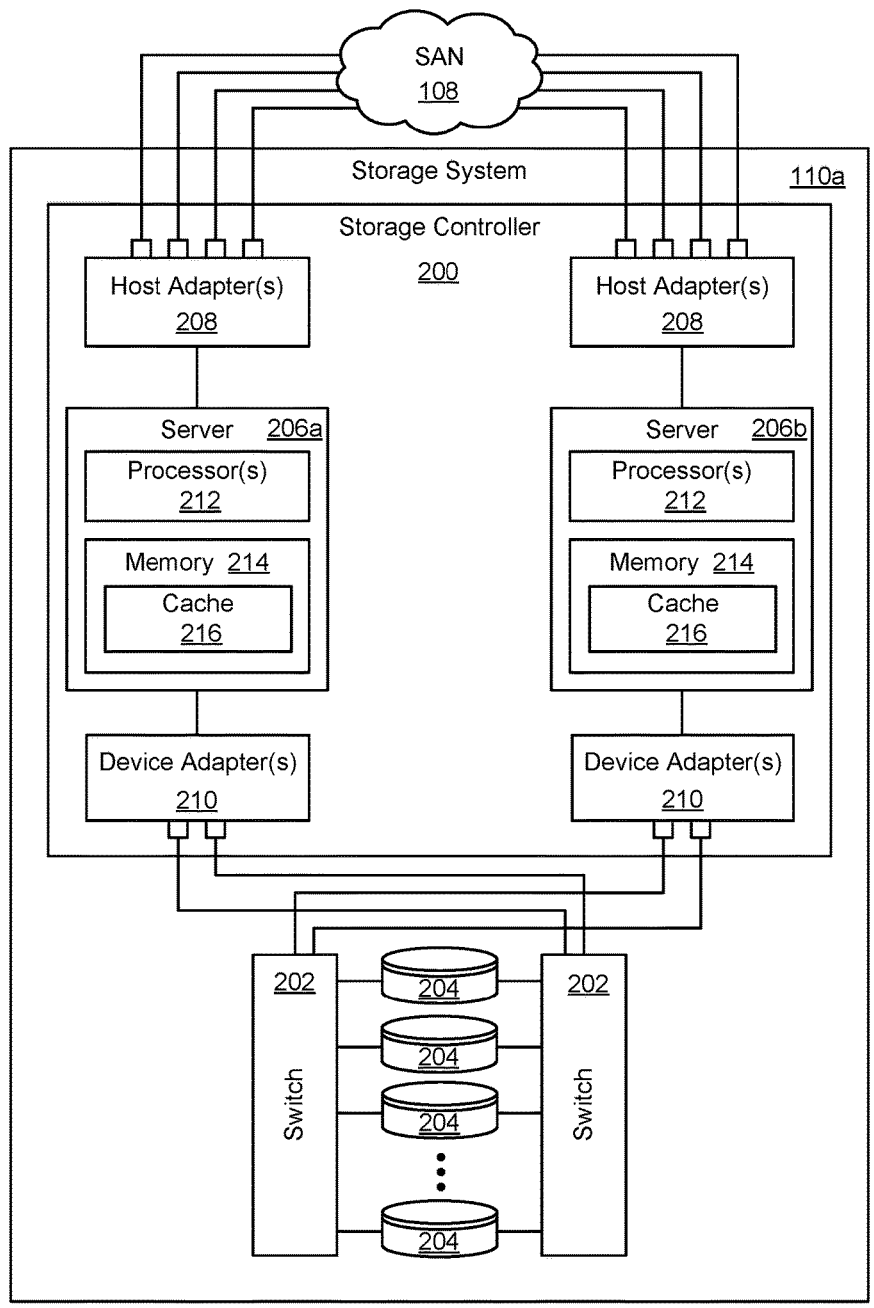
FIG. 2 is a high-level block diagram showing one embodiment of a backend storage system, in this example an array of storage drives.

Referring to FIG. 2, one example of a storage system 110a containing an array of hard-disk drives 204 and/or solid-state drives 204 is illustrated. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
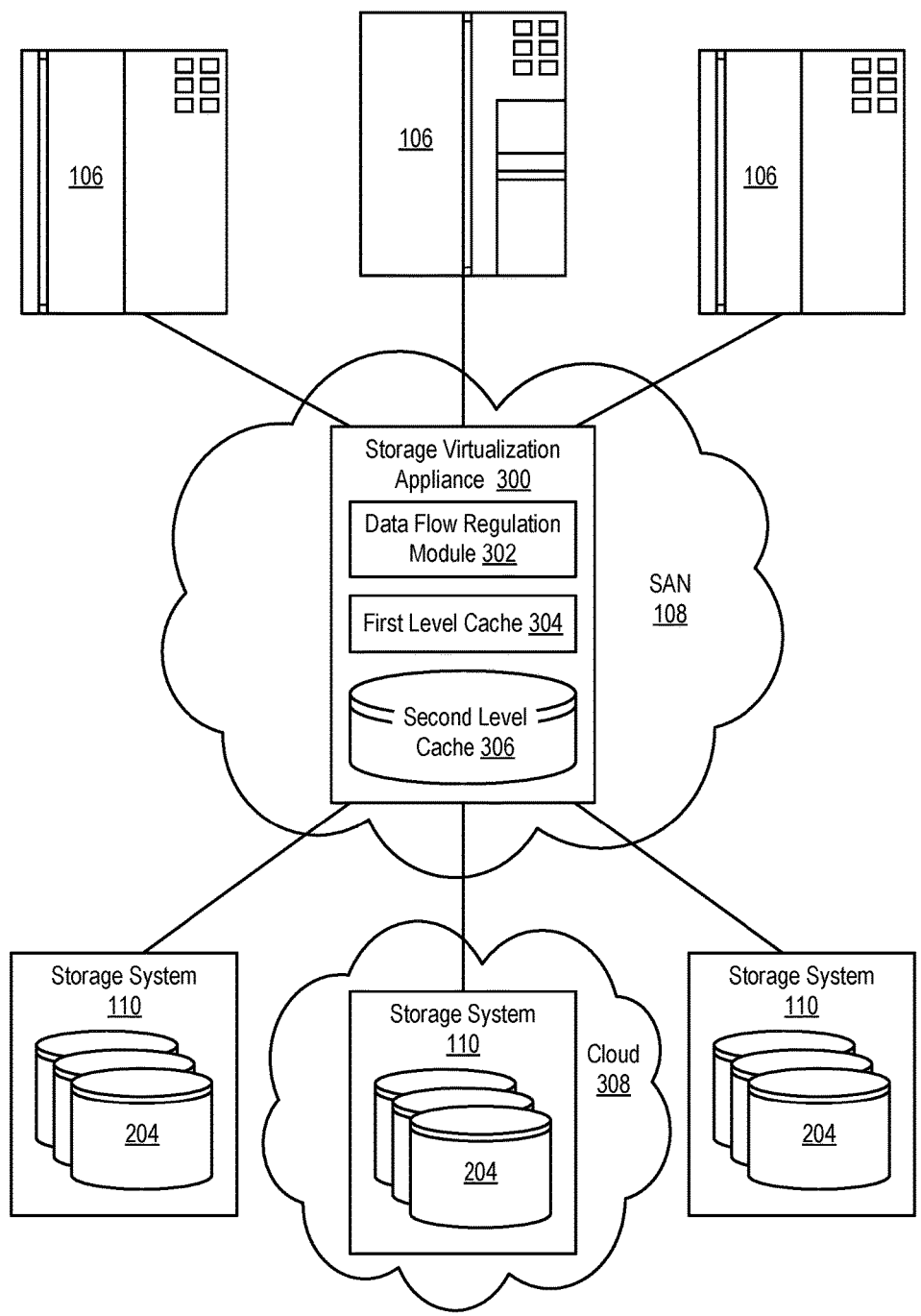
FIG. 3 is a high-level block diagram showing a storage virtualization appliance logically located between host systems and backend storage systems.

Referring to FIG. 3, as previously mentioned, in some storage architectures, a storage virtualization appliance 300 such as IBM's SAN Volume Controller (SVC) may be logically located between host systems 106 and backend storage systems 110. The storage virtualization appliance 300 may provide a virtualization layer between the host systems 106 and storage systems 110. More specifically, the storage virtualization appliance 300 may present itself to host systems 106 as a storage provider (target) and present itself to storage systems 110 as a single host system 106 (initiator). The storage systems 110 may include local or remote storage systems 110 and/or cloud-based storage systems 110 (i.e., storage systems 110 accessible through the cloud 308 or in association with a service provided by the cloud 308). Configuring the storage architecture in this manner may enable various components to be replaced with minimal disruption. It may also provide compatibility between components in strongly heterogeneous server and storage environments.

As shown, the storage virtualization appliance 300 may include a first level cache 304 that stores a relatively small amount of data (e.g., under 1 TB) to provide fast response times to host systems 106. The first level cache 304 enables the storage virtualization appliance 300 to absorb bursts of write data from host systems 106 without the host systems 106 being aware of the underlying write performance of storage systems 110 behind the storage virtualization appliance 300. However, the ability of the first level cache 304 to absorb writes from a host system 106 is not unlimited. For example, if a storage system 110 is able to absorb 1 GB of data per second, the first level cache 304 has 10 GB of storage capacity, and a host system writes to the first level cache 304 at a rate of 1.1 GB per second, the cache can only absorb data for one hundred seconds before it runs out of space (since the cache is filling at the rate of 1.1 GB-1.0 GB, or 0.1 GB per second). Thus, in this example, using only the first level cache 304, the storage virtualization appliance 300 may only hide the fact that the host system 106 is submitting more data than the storage system 110 can handle for one hundred seconds. While this may be sufficient for bursts of writes that are less than one hundred seconds, it may be problematic for longer bursts of data, such as backups and other large data transfers. It may be particularly problematic with cloud-based storage systems 110 that may incur additional costs when peak bandwidth or other limits are exceeded.

In order to more effectively regulate the rates at which data is transferred to storage systems 110 and ensure that limits associated with particular storage systems 110 are not exceeded, a second level cache 306 may be added to the storage virtualization appliance 300. This second level cache 306 may smooth out inconsistencies in data transfer rates. In certain embodiments, the second level cache 306 is substantially larger than the first level cache 304 but has reduced performance (e.g., is slower) compared to the first level cache 304. For example, in certain embodiments, the second level cache 306 is made up of one or more storage drives such as hard disk drives and/or solid state drives. Data in the second level cache 306 may in certain embodiments be stored in a self-describing format so that it may be recognized by other storage virtualization appliances 300. This may be helpful in the event the original storage virtualization appliance 300 becomes unusable and the second level cache 306 has to be inserted into another storage virtualization appliance 300 to recover data thereon.

A data flow regulation module 302 within or associated with the storage virtualization appliance 300 may control the operation of and flow of data through the first level cache 304 and the second level cache 306. In general, the data flow regulation module 302 may receive, into the first level cache 304, writes from host systems 106 intended for backend storage volumes 204. A backend storage volume 204 may be an individual storage drive 204, a collection or array of storage drives 204, a portion of a storage drive 204, storage space on a local or remote storage system 110, storage space on a cloud-based storage system 110, and/or the like.

Figure 4:
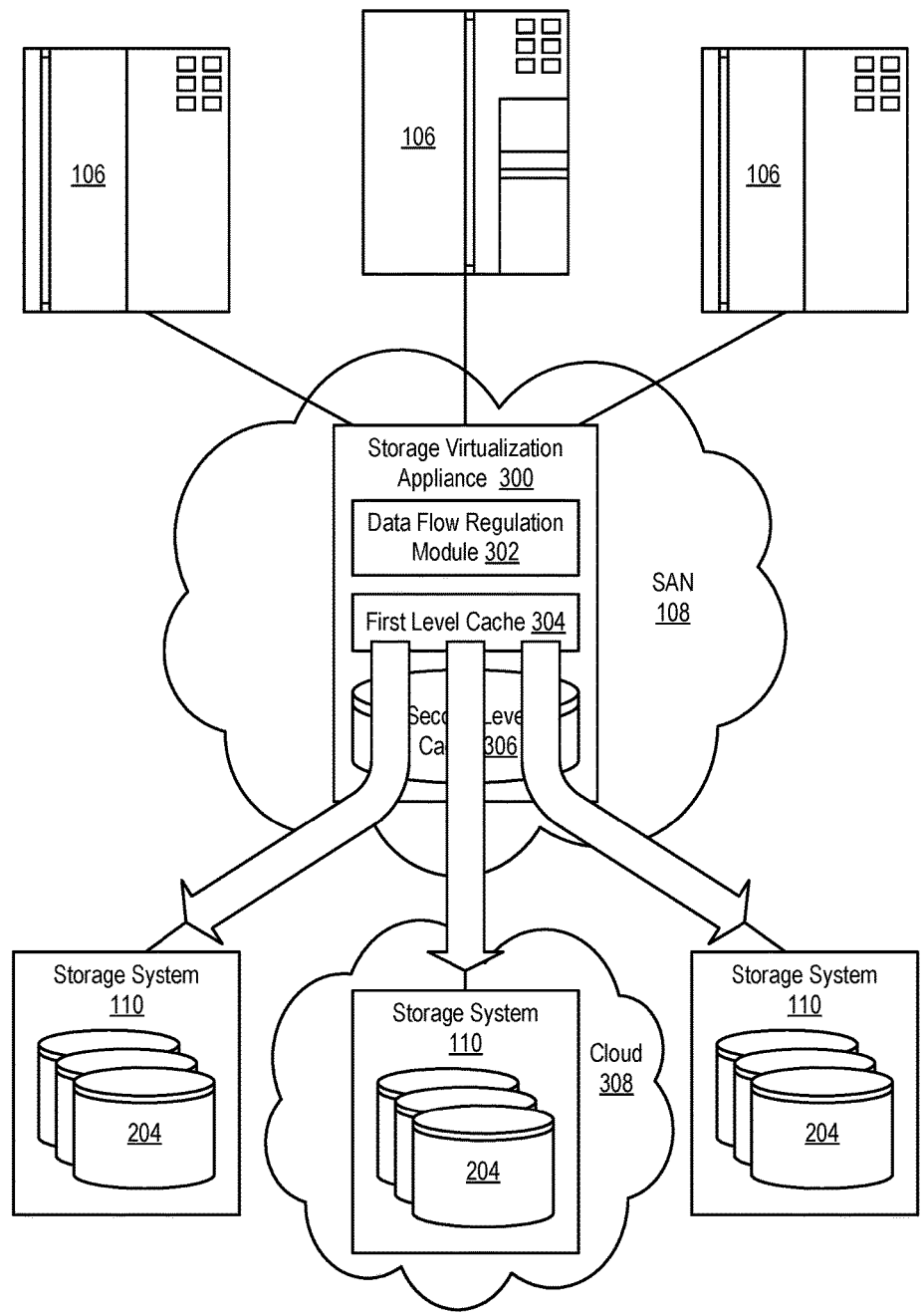
FIG. 4 is a high-level block diagram showing direct destaging of data from a first level cache to backend storage systems.
Figure 5:
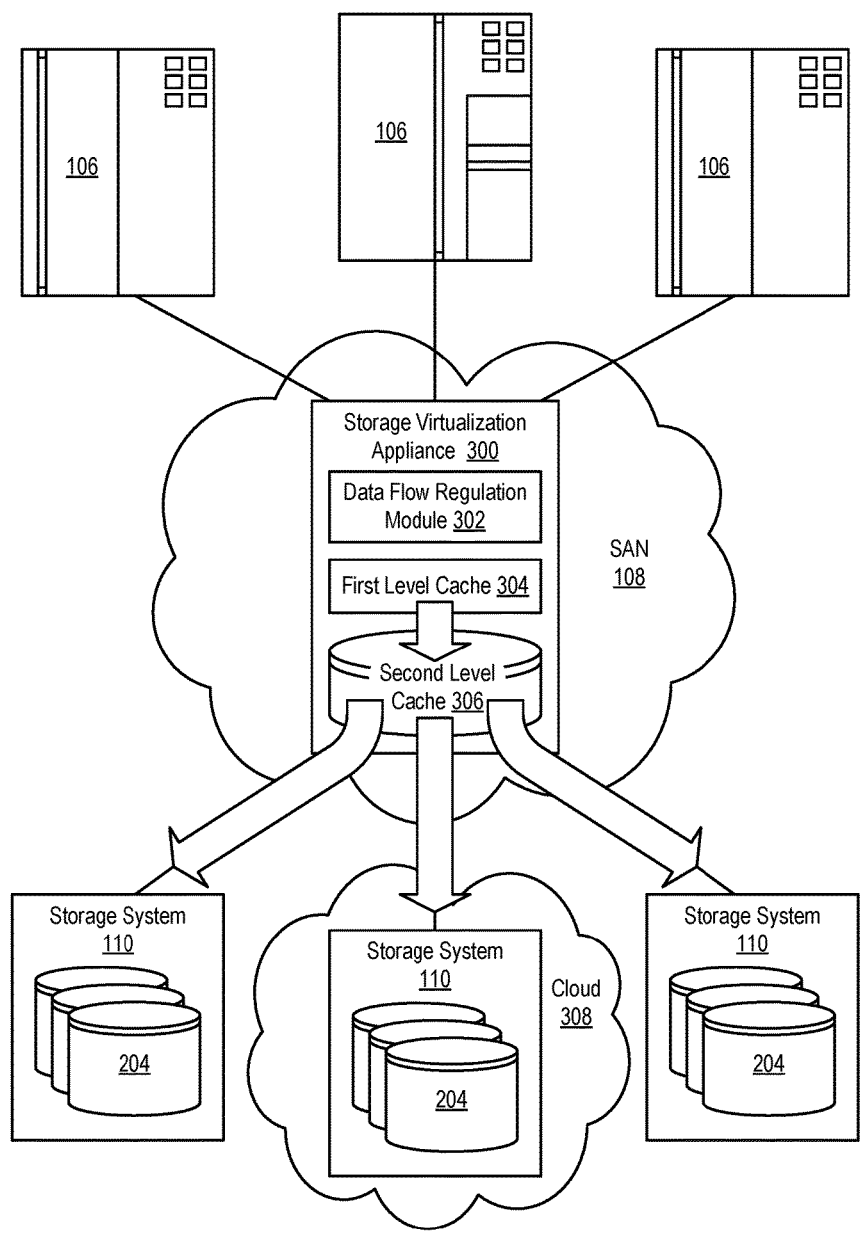
FIG. 5 is a high-level block diagram showing destaging of data from a first level cache to a second level cache, and then on to backend storage systems.

The data flow regulation module 302 may determine whether destaging writes directly from the first level cache 304 to a backend storage volume 204 would cause a limit associated with the backend storage volume 204 to be exceeded. If not, the data flow regulation module 302 may destage the writes directly from the first level cache 304 to the backend storage volume 204, as shown in FIG. 4. By contrast, if destaging the writes directly from the first level cache 304 to the backend storage volume 204 would cause the limit to be exceeded, the data flow regulation module 302 may destage the writes from the first level cache 304 to the second level cache 306, as shown in FIG. 5. The data flow regulation module 302 may then destage the writes from the second level cache 306 to the backend storage volume 204 as time and resources allow and in a way that does not exceed the limit, as further shown in FIG. 5. The manner in which the data flow regulation module 302 works will be discussed in more detail in association with FIG. 6.

Figure 6:
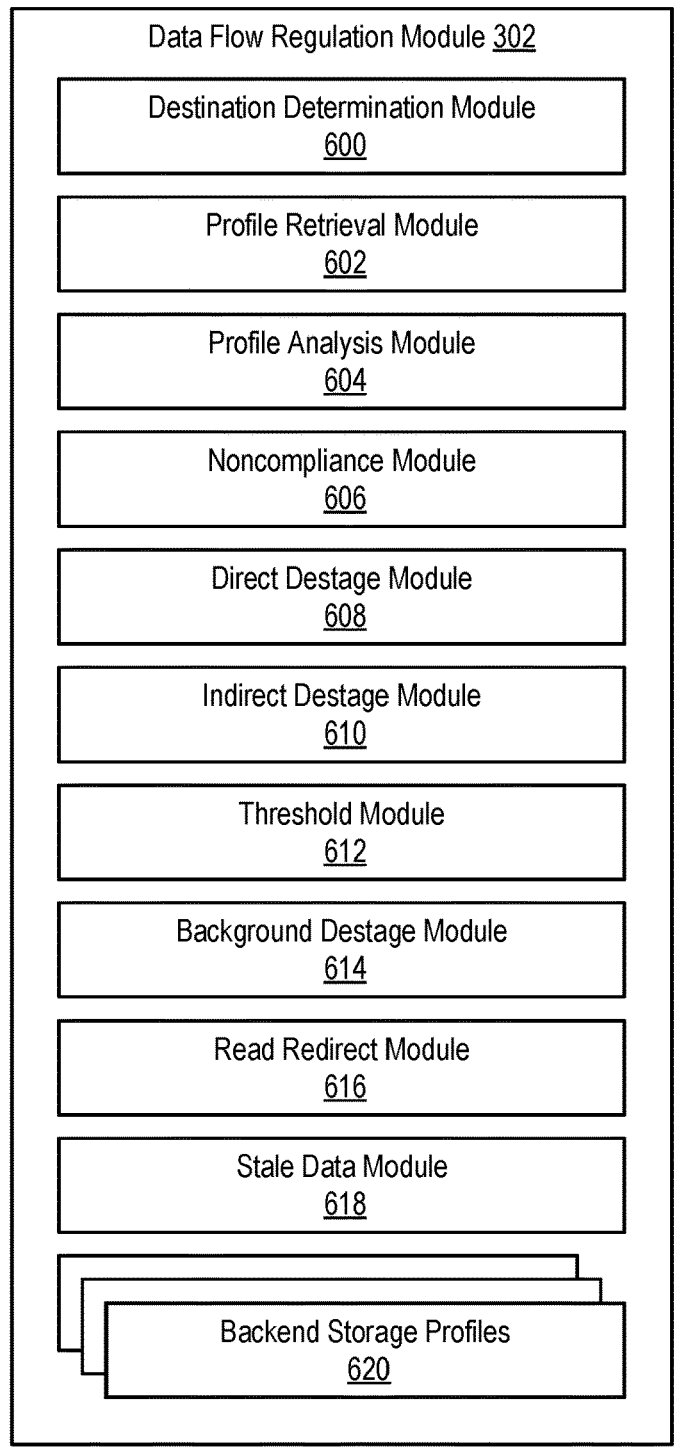
FIG. 6 is a high-level block diagram showing sub-modules within a data flow regulation module in accordance with the invention.

Referring to FIG. 6, in order to provide the functionality described above, the data flow regulation module 302 may include various sub-modules to perform various features and functions. These sub-modules may be implemented in hardware, software, firmware, or combinations thereof. The sub-modules are presented by way of example and are not intended to represent an exhaustive list of sub-modules that may be included within the data flow regulation module 302. The data flow regulation module 302 may include more or fewer sub-modules than those illustrated, or the functionality of the sub-modules may be organized differently.

As shown, the data flow regulation module 302 may include one or more of a destination determination module 600, profile retrieval module 602, profile analysis module 604, noncompliance module 606, direct destage module 608, indirect destage module 610, threshold module 612, background destage module 614, read redirect module 616, and stale data module 618. The data flow regulation module 302 may also maintain one or more backend storage profiles 620, the function and purpose of which will be described in more detail hereafter.

When it is time to destage writes from the first level cache 304, the destination determination module 600 may determine an intended destination for the data, or stated otherwise, the backend storage volume 204 for the which the writes are intended. Once this is determined, the profile retrieval module 602 may retrieve a backend storage profile 620 associated with the backend storage volume 204. The backend storage profile 620 may store information regarding ideal I/O workloads or limits associated with a backend storage volume 204, which may be expressed in terms of I/Os per second, megabytes per second, and/or the like. The backend storage profile 620 may also store information such as whether functionality of the data flow regulation module 302 should be used in association with the backend storage volume 204, and/or whether limits associated with the backend storage volume 204 should be exceeded if data redundancy is lost (i.e., some storage virtualization appliances 300 may store multiple copies of data in the event one of the copies is lost due to an event such as a power outage). If such redundancy is lost, the profile 620 may indicate a preference to immediately destage writes from the cache 302, 304 to backend storage volumes 204 to ensure the data is preserved, regardless of whether limits are violated. Cloud providers may charge additional fees if a bandwidth or other limit is exceeded but customers may be willing to pay the additional fees to avoid potential data loss.

The noncompliance module 606 may determine whether destaging writes directly from the first level cache 304 to a backend storage volume 204 will cause noncompliance with the limits and/or parameters specified in the backend storage profile 620. Such noncompliance may include exceeding limits such as a bandwidth limit associated with the backend storage volume 204, an allowable amount of data transferred to the backend storage volume 204, an amount or number of I/Os performed on the backend storage volume 204 in a specified amount of time, and/or the like. If destaging writes directly from the first level cache 304 to the backend storage volume 204 would not result in noncompliance, the direct destage module 608 may directly destage the writes from the first level cache 304 to the backend storage volume 204.

If, on the other hand, destaging writes directly from the first level cache 304 to the backend storage volume 204 would cause the above-described noncompliance, the indirect destage module 610 may destage the writes to the second level cache 306. In other embodiments, the direct destage module 608 may destage some amount of writes directly to the backend storage volume 204 to the extent that they would not cause noncompliance with the limits/parameters specified in the backend storage profile 620, while the indirect destage module 610 destages, to the second level cache 306, other writes that if transmitted would cause noncompliance. Thus, a group of writes may be split such that some writes go to the backend storage volume 204, while others go to the second level cache 306 for eventual transmission to the backend storage volume 204.

Once writes are destaged to the second level cache 306, the background destage module 614 may destage these writes from the second level cache 306 to the backend storage volume 204 as time and resources allow, and/or in ways that would not cause the limits/parameters to be exceeded. This may include destaging data from the second level cache 306 at a slower rate and/or during periods of time when destaging the writes to the backend storage volume 204 would not cause its limits/parameters to be exceeded. Because the second level cache 306 may be significantly larger than the first level cache 304, the second level cache 306 may be able to absorb, for a significantly longer period of time, excess data resulting from a mismatch between the rate the second level cache 306 is receiving data versus the rate data is being destaged to the backend storage volume 204. The second level cache 306 may surpass the ability of the first level cache 304 to absorb this excess data.

In certain embodiments, a threshold module 612 may determine when a backend storage volume 204 is idle or operating below a specified level of activity. When such a condition is detected, the threshold module 612 may invoke the background destage module 614 to destage data from the second level cache 306 to the backend storage volume 204. In this way, the background destage module 614 may destage writes from the second level cache 306 to the backend storage volume 204 during off-peak periods of I/O.

When writes are stored in the second level cache 306 but have not yet been destaged to the backend storage volume 204, the read redirect module 616 may route read requests for this data to the second level cache 306. Markers or other indicators may indicate which data is stored in the second level cache 306 but has not been destaged to the backend storage volume 204. Similarly, the stale data module 618 may invalidate stale data in the second level cache 306. For example, if updated data is written to the first level cache 304 and this data is destaged directly to the backend storage volume 204, former versions of the data in the second level cache 306 may become stale (no longer good or representing a current version of the data). In such cases, the stale data module 618 may identify this data as stale and clear this data from the second level cache 306.

Figure 7:
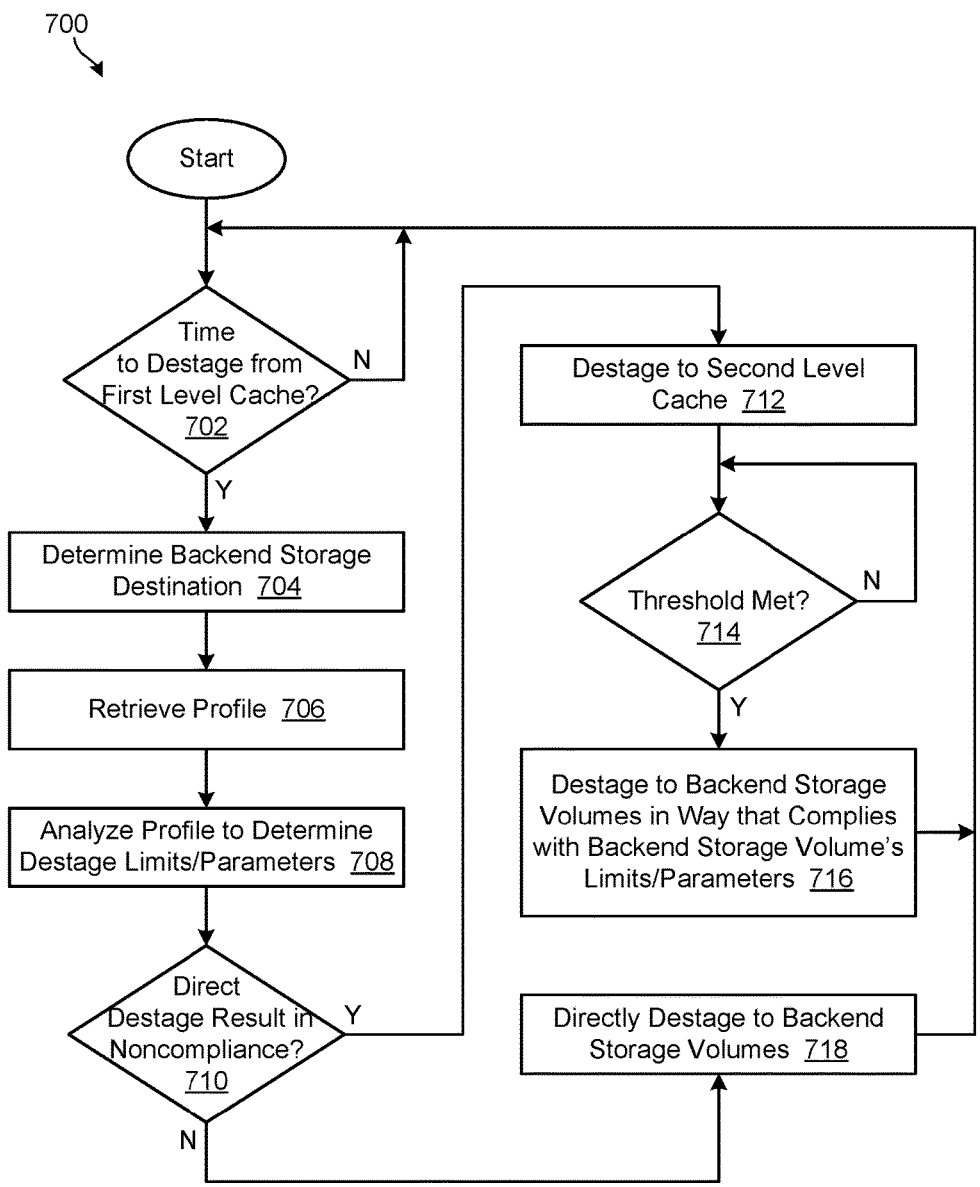
FIG. 7 is a process flow diagram showing one embodiment of a method for destaging data from cache of a storage virtualization appliance.

Referring to FIG. 7, one embodiment of a method 700 for destaging data from cache 302, 304 of a storage virtualization appliance 300 is illustrated. As shown, the method 700 initially determines 702 whether it is time to destage writes from the first level cache 304. If so, the method 700 determines 704 which backend storage volume 204 is the intended destination for the data and retrieves 706 the backend storage profile 620 associated with the backend storage volume 204. The method 700 then analyzes 708 the backend storage profile 620 to determine limits/parameters associated with the backend storage volume 204. The method 700 then determines 710 whether directly destaging data from the first level cache 304 to the backend storage volume 204 would cause noncompliance with the limits/parameters (e.g., cause certain limits to be exceeded). If not, the method 700 directly destages 718 the writes from the first level cache 304 to the backend storage volume 204. The method 700 then ends by returning to step 702.

When writes are destaged directly from the first level cache 304 to the backend storage volume 204, statistics associated with the backend storage volume 204 may be updated to reflect the additional I/O to the backend storage volume 204. These statistic may, in certain embodiments, be stored in the backend storage profile 620 associated with the backend storage volume 204. Thus, a backend storage profile 620 may, in certain embodiments, store not only limits associated with a backend storage volume 204, but also statistics such as a current bandwidth value or number of I/Os per time period that are being performed on a backend storage volume 204. These statistic may be helpful in determining if and when various limits associated with the backend storage volume 204 are exceeded.

Returning again to the method 700, if destaging the writes directly to the backend storage volume 204 would cause noncompliance with the limits/parameters, the method 700 destages 712 the writes to the second level cache 306 and waits 714 for a threshold to be met. This threshold may be a state of idleness or a selected level of activity on the backend storage volume 204. Once this threshold is met, the method 700 destages 716 the writes to the backend storage volume 204 in a way that complies with the limits/parameters specified in the backend storage profile 620. This may include, for example, destaging the writes at a slower rate or with different timing. The method 700 then ends by returning to step 702.

By providing a second level cache 306 that is able to absorb extra writes while at the same time regulating data flow to a backend storage volume 204, host systems 106 and/or applications executing on host systems 106 may not need to have knowledge or understanding of limitations of backend storage volumes 204. That is, host systems 106 and/or applications executing on the host systems 106 may transit data to the storage virtualization appliance 300 without regard to the limitations of backend storage volumes 204 and without having to be concerned that the backend storage volumes 204 will be overwhelmed with data or will receive more data than they can handle.

The storage virtualization appliance 300 illustrated in FIGS. 3 through 5 is shown as a separate appliance logically located between host systems 106 and storage systems 110. However, the storage virtualization appliance 300 is not limited to such implementations. For example, functionality of the storage virtualization appliance 300 may in certain embodiments be implemented in a storage controller 200. Alternatively all of part of the storage virtualization appliance 300 may be implemented in a host system 106. In other embodiments, functionality of the storage virtualization appliance 300 may be spread across multiple devices. Thus, the storage virtualization appliance 300 and data flow regulation module 302 may be implemented in locations other than those illustrated.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for regulating a flow of data to backend storage devices, the method comprising:
    generating, at a host system, writes intended for a backend storage volume;
    receiving the writes into a first level cache of a storage virtualization appliance;
    determining whether destaging the writes directly from the first level cache to the backend storage volume would cause a limit associated with the backend storage volume to be exceeded;
    if destaging the writes directly from the first level cache to the backend storage volume would cause the limit to be exceeded, destaging the writes from the first level cache to a second level cache of the storage virtualization appliance; and
    if destaging the writes directly from the first level cache to the backend storage volume would not cause the limit to be exceeded, destaging the writes directly from the first level cache to the backend storage volume.

2. The method of claim 1, wherein the backend storage volume is hosted on a local storage system.

3. The method of claim 1, wherein the backend storage volume is hosted on a cloud-based storage system.

4. The method of claim 1, wherein the first level cache is substantially faster and smaller than the second level cache.

5. The method of claim 1, wherein the limit is one of a bandwidth limit associated with the backend storage volume, an allowable amount of data transferred to the backend storage volume, and a number of I/Os performed on the backend storage volume in a specified amount of time.

6. The method of claim 1, wherein determining further comprises analyzing, by the storage virtualization appliance, a profile associated with the backend storage volume, the profile describing the limit.

7. The method of claim 1, further comprising, in the event the writes are destaged from the first level cache to the second level cache, destaging the writes from the second level cache to the backend storage volume at a rate that does not exceed the limit.

8. A computer program product for regulating a flow of data to backend storage devices, the computer program product comprising a non-transitory computer-readable storage medium having computer-usable program code embodied therein, the computer-usable program code configured to perform the following when executed by at least one processor:
   generate, at a host system, writes intended for a backend storage volume;
   receive the writes into a first level cache of a storage virtualization appliance;
   determine whether destaging the writes directly from the first level cache to the backend storage volume would cause a limit associated with the backend storage volume to be exceeded;
   if destaging the writes directly from the first level cache to the backend storage volume would cause the limit to be exceeded, destage the writes from the first level cache to a second level cache of the storage virtualization appliance; and
   if destaging the writes directly from the first level cache to the backend storage volume would not cause the limit to be exceeded, destage the writes directly from the first level cache to the backend storage volume.

9. The computer program product of claim 8, wherein the backend storage volume is hosted on a local storage system.

10. The computer program product of claim 8, wherein the backend storage volume is hosted on a cloud-based storage system.

11. The computer program product of claim 8, wherein the first level cache is substantially faster and smaller than the second level cache.

12. The computer program product of claim 8, wherein the limit is one of a bandwidth limit associated with the backend storage volume, an allowable amount of data transferred to the backend storage volume, and a number of I/Os performed on the backend storage volume in a specified amount of time.

13. The computer program product of claim 8, wherein determining further comprises analyzing, by the storage virtualization appliance, a profile associated with the backend storage volume, the profile describing the limit.

14. The computer program product of claim 8, wherein the computer-usable program code is further configured to, in the event the writes are destaged from the first level cache to the second level cache, destage the writes from the second level cache to the backend storage volume at a rate that does not exceed the limit.

15. A system for regulating a flow of data to backend storage devices, the system comprising:
   at least one processor;
   at least one memory device coupled to the at least one processor and storing instructions for execution on the at least one processor, the instructions causing the at least one processor to:
      generate, at a host system, writes intended for a backend storage volume;
      receive the writes into a first level cache of a storage virtualization appliance;
      determine whether destaging the writes directly from the first level cache to the backend storage volume would cause a limit associated with the backend storage volume to be exceeded;
      if destaging the writes directly from the first level cache to the backend storage volume would cause the limit to be exceeded, destage the writes from the first level cache to a second level cache of the storage virtualization appliance; and
      if destaging the writes directly from the first level cache to the backend storage volume would not cause the limit to be exceeded, destage the writes directly from the first level cache to the backend storage volume.

16. The system of claim 15, wherein the backend storage volume is hosted on one of a local storage system and a cloud-based storage system.

17. The system of claim 15, wherein the first level cache is substantially faster and smaller than the second level cache.

18. The system of claim 15, wherein the limit is one of a bandwidth limit associated with the backend storage volume, an allowable amount of data transferred to the backend storage volume, and a number of I/Os performed on the backend storage volume in a specified amount of time.

19. The system of claim 15, wherein determining further comprises analyzing, by the storage virtualization appliance, a profile associated with the backend storage volume, the profile describing the limit.

20. The system of claim 15, wherein the instructions further cause the at least one processor to, in the event the writes are destaged from the first level cache to the second level cache, destage the writes from the second level cache to the backend storage volume at a rate that does not exceed the limit.

* * * * *